(12) United States Patent
Qing et al.

(10) Patent No.: US 7,953,015 B2
(45) Date of Patent: May 31, 2011

(54) METHOD FOR ENSURING RELIABILITY IN NETWORK

(75) Inventors: Wu Qing, Shenzhen (CN); Yuepeng Chen, Shenzhen (CN); Lingyuan Fan, Shenzhen (CN); Dengchao Wu, Shenzhen (CN); Ting Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 638 days.

(21) Appl. No.: 11/610,693

(22) Filed: Dec. 14, 2006

(65) Prior Publication Data

US 2007/0189316 A1 Aug. 16, 2007

Related U.S. Application Data

(63) Continuation of application No. PCT/CN2005/000847, filed on Jun. 14, 2005.

(30) Foreign Application Priority Data

Jun. 14, 2004 (CN) .......................... 2004 1 0048239
Jun. 18, 2004 (CN) .......................... 2004 1 0048771

(51) Int. Cl.
*G06F 11/00* (2006.01)
(52) U.S. Cl. ............. 370/242; 370/255; 709/224; 714/4
(58) Field of Classification Search .................. 370/216, 370/217, 218, 219, 220, 221, 222, 223, 229, 370/235, 235.1, 236, 236.1, 236.2, 238, 238.1, 370/239, 241, 242, 244, 245, 248, 249, 250, 370/251, 252, 254, 255, 351, 389; 709/201, 709/202, 203, 208, 209, 223, 224, 226, 238, 709/239; 700/1, 79, 82; 714/100, 1, 2, 3, 714/4, 47
See application file for complete search history.

(56) References Cited

U.S. PATENT DOCUMENTS 5,696,895 A * 12/1997 Hemphill et al. ................ 714/4

(Continued)

FOREIGN PATENT DOCUMENTS

CN 1308278 8/2001

(Continued)

OTHER PUBLICATIONS

Microsoft Technet, "How Network Load Balancing Technology Works," available at: http://technet2.microsoft.com/windowsserver/en/library/1611cae3-5865-4897-a186-7e6ebd8855cb1033.mspx?pf=true.

(Continued)

*Primary Examiner* — Seema S Rao
*Assistant Examiner* — K. H.
(74) *Attorney, Agent, or Firm* — Marshall, Gerstein & Borun LLP

(57) ABSTRACT

A method for ensuring reliability in a network is disclosed, including: distributing, based on service flow, services to multiple home functions entities of the coupled function entity, where the multiple home function entities have identical functional characteristics in the network; taking over, by a first home function entity operating normally, work of a second home function entity to be switched if determining to switch between the multiple home function entities. Through the method, if one or more of the multiple home function entities is in failure, other home function entities may take over work of the function entities in failure, which ensures the continuity of data flows of services and prevents the services from being interrupted, greatly improves reliability and load balancing ability of end-to-end QoS architecture. Furthermore. There is no limitation on network architecture and the method is applicable to networks with any scales.

13 Claims, 5 Drawing Sheets

U.S. PATENT DOCUMENTS

| | | | |
|---|---|---|---|
| 5,963,448 A * | 10/1999 | Flood et al. ................... 700/82 |
| 6,145,089 A * | 11/2000 | Le et al. ............................. 714/4 |
| 6,542,461 B1 | 4/2003 | Faye et al. |
| 6,587,970 B1 * | 7/2003 | Wang et al. ..................... 714/47 |
| 6,944,131 B2 * | 9/2005 | Beshai et al. ............. 370/238.1 |
| 7,483,374 B2 * | 1/2009 | Nilakantan et al. ........... 370/235 |
| 2002/0080807 A1 | 6/2002 | Lind |
| 2002/0095489 A1 * | 7/2002 | Yamagami ..................... 709/224 |
| 2003/0005350 A1 * | 1/2003 | Koning et al. ..................... 714/4 |
| 2003/0063560 A1 | 4/2003 | Jenq et al. |
| 2004/0064558 A1 * | 4/2004 | Miyake .......................... 709/226 |
| 2004/0153533 A1 * | 8/2004 | Lewis ............................. 709/223 |
| 2004/0199812 A1 | 10/2004 | Earl et al. |
| 2004/0208175 A1 * | 10/2004 | McCabe ......................... 370/389 |
| 2004/0243702 A1 * | 12/2004 | Vainio et al. ................... 709/224 |
| 2004/0257983 A1 * | 12/2004 | Kopp et al. .................... 370/217 |
| 2006/0031283 A1 * | 2/2006 | Tuttle et al. .................... 709/203 |

FOREIGN PATENT DOCUMENTS

| | | |
|---|---|---|
| CN | 1418023 | 5/2003 |
| CN | 1601966 | 3/2005 |
| CN | 1601971 | 3/2005 |
| CN | 100391154 | 3/2005 |
| CN | 100455035 | 3/2005 |
| CN | 100486190 | 3/2005 |
| CN | 100486191 | 3/2005 |
| CN | 100550794 | 3/2005 |
| CN | 100589401 | 3/2005 |
| CN | 100334838 C | 1/2006 |
| WO | WO 98/49620 | 11/1998 |
| WO | WO 03048936 A1 * | 6/2003 |

OTHER PUBLICATIONS

Seitz, "ITU-T Recs. Y.1541 and Y.1221—A Basis for IP Network QoS Control and Traffic Management," U.S. Department of Commerce, NTIA/ITS, pp. 1-8 (2003).

Supplementary European Search Report for Application No. EP05757340, dated Jan. 14, 2008.

International Search Report for PCT/CN2005/000847, mailed Sep. 8, 2005.

Chinese rejection decision with partial English translation from Chinese Application No. 200410048771.4 dated Jan. 8, 2010.

First Chinese Office Action with partial English translation from Chinese Application No. 200410048239.2 dated Mar. 9, 2007.

First Chinese office action with partial English translation from Chinese Application No. 200410048771.4 dated Sep. 7, 2007.

First European office action from European Application No. 05 757 340.4 dated Jun. 6, 2008.

NEC Press Release, NEC to Introduce Large-scale Router and QoS Server for Highest-Quality INternet Infrastructure, dated May 7, 2001.

QBone Bandwidth Broker Architecture—Work in Progress (2000).

Second Chinese office action with partial English translation from Chinese Application No. 200410048771.4 dated Apr. 18, 2008.

Third Chinese office action with partial English translation from Chinese Application No. 200410048771.4 dated Apr. 18, 2008.

Written opinion of the International Searching Authority from PCT/CN2005/000847 dated Sep. 8, 2005.

* cited by examiner

METHOD FOR ENSURING RELIABILITY IN NETWORK

CROSS-REFERENCES TO RELATED APPLICATIONS

This is a continuation of International Application No. PCT/CN2005/000847, which was filed on Jun. 14, 2005, and which, in turn, claimed the benefit of Chinese Patent Application No. 200410048239.2, which was fled on Jun. 14, 2004, and Chinese Patent Application No. 200410048771.4, which was filed on Jun. 18, 2004, the entire disclosures of which are hereby incorporated herein by reference.

BACKGROUND OF THE DISCLOSURE

1. Field of the Technology

The present invention relates to control technologies of end-to-end Quality of Service (QoS), and particularly, to a method for ensuring reliability in a network.

2. Background of the Invention

With the continual enlargement of the scale of the Internet, various network services have come into existence and advanced multimedia systems have also emerged in endlessly. A real-time service will be affected greatly if a service, such as the service of File Transfer Protocol (FTP), which is highly burst, or the service of Hypertext Transfer Protocol (HTTP), which contains image files, occurs in networks since the real-time service is relatively sensitive to such network characteristics as transmission delay and delay jitter. Furthermore, as a multimedia service occupies a large amount of bandwidth, it would be difficult to reliably transmit a key service of which the transmission has to be guaranteed in the existing network. As a result, various QoS technologies have been proposed so as to guarantee the reliable transmission of a key service. For example, the Internet Engineering Task Force (IETF) has proposed many service models and mechanisms to meet demands for QoS. At present, what is comparatively approbatory to the industry is to adopt the Integrated Service (Int-Serv) model at the access of a network or at the edge of a network and to adopt the Differentiated Service (Diff-Serv) model at the core of a network.

The Diff-Serv model ensures QoS only by such measures as setting priority. Although the Diff-Serv model has the advantage of high line utilization, it is hard to expect the specific effect of the model. Therefore, the industry introduces a separate bearer control layer and sets up a special Diff-Serv QoS signaling mechanism for the Diff-Serv model of a backbone network, and sets up a resource management layer to manage network topology resources for a Diff-Serv network. The Diff-Serv model using such a resource management method is called the Diff-Serv model including a separate bearer control layer. FIG. 1 is a schematic diagram of the Diff-Serv model. In the figure, 101 is a service server, which belongs to the service control layer and can implement functions including soft-switch, such as Calling Agent (CA); 102 is a bearer network resource manager, which belongs to the bearer control layer; 103 is an Edge Router (ER) and 104 is a Core Router, both of which belong to the bearer network. In the Diff-Serv model, the bearer network resource manager is for configuring management rules and network topology and allocating resources for the service bandwidth application of a user. Signaling is used to deliver, between the bearer network resource managers of each management domain, the request and result of the service bandwidth application of a user, as well as the information of path assigned by each of the bearer network resource managers for the service bandwidth application. When dealing with the service bandwidth application of a user, the bearer control layer determines the path of a user service, and the bearer network resource manager will notify the ER to forward the service flow according to the path determined. Regarding how the bearer network forwards the service flow of the user through a designated route according to the path determined by the bearer control layer, the conventional technology of the industry is mainly based on the Multi-Protocol Label Switching (MPLS) technology to build a Label Switched Path (LSP) along the path of service flow determined by the bearer control layer using the method of resource reservation and build an end-to-end LSP using the explicit routing mechanism of Resource ReSerVation Protocol-Service Traffic Engineering (RSVP-TE) or Constraint-based Label Distribution Protocol (CR-LDP).

At present, key function entities in the network including a separate bearer control layer are simply connected with each other, and if a function entity such as a Resource Control Function (RCF) entity is in failure or is busy in service, other function entities associated with the function entity, such as the ER or a Service Control Function (SCF) entity, cannot operate effectively and fully in the conventional system architecture. That is, in the prior art, there is no reliability technology in the network including a separate bearer control layer for ensuring the normal operation of the network in the case that a function entity is in failure.

At present, the simplest method for ensuring reliability is cold backup. The cold backup means that an entity serves as a complete backup of another entity. Suppose that A is entity A while B is the backup entity of entity A, entity A will be completely replaced by backup entity B if entity A is in failure. However, for backup entity B, the prerequisite for implementing the complete replacement is that both the bearer connection and the service connection have to be rebuilt. Such a method of cold backup, which could be implemented easily, is the most efficient routing mechanism in the early stage of networking because the scale of the network is small, demands of services for real-time characteristics are relatively lower, and the cold backup requires no switching and smoothing. Therefore, the cold backup can usually function well so long as the amount of services is small and an interruption is permitted. However, with the increase in the amount of services and the expansion of the services with a high demand for real-time characteristics, the user hopes to feel as if the services would not be interrupted. As a result, through adopting the cold backup method, the services should be interrupted and rebuilt when a device is in failure. Therefore, if the cold backup is adopted in a Wide Area Network, which is complex and has a high demand for real-time characteristics, many services may be interrupted and rebuilt when there is a failure in a certain segment of the bearer network. At the same time, the method does not have multi-homed characteristics of key service nodes and cannot ensure load balancing and network security.

SUMMARY OF THE INVENTION

An embodiment of the present invention provides a method for ensuring reliability in a network, which enables the network to ensure continuity of a service in the network and reliability of QoS of the network.

In one embodiment, a method for ensuring reliability in a network including a separate bearer control layer includes:
  distributing, based on service flow according to a preset proportionally distributing strategy, services of one coupled function entity to multiple home function entities of the coupled function entity, wherein the multiple home function entities have identical functional characteristics in the network;
  taking over, by a first home function entity operating normally, work of a second home function entity to be switched if determining to switch between the multiple home function entities.

The process of determining to switch between the multiple home function entities includes:
  detecting, in real time through a heartbeat line between any two home function entities of the multiple home function entities, whether the first home function entity receives a heartbeat signal of the second home function entity in a designated time period;
  determining to switch between the multiple home function entities if the first home function entity receives no heartbeat signal of the second home function entity in the designated time period.

The process of determining to switch between the multiple home function entities includes:
  determining, by the coupled function entity, whether the second home function entity is in failure or a switching instruction is received from a third party;
  determining to switch the services to the first home function entity if the second home function entity is in failure or the switching instruction is received from a third party.

The process of determining whether the second home function entity is in failure includes:
  detecting, by the coupled function entity, state of a protocol connection between the coupled function entity and the second home function entity;
  determining that the second home function entity corresponding to the protocol connection is in failure if the protocol connection is disconnected.

The multiple home function entities work in a master/backup manner or in a load sharing manner.

When the coupled function entity is an entity of the bearer control layer and the multiple home function entities are bearer nodes, the method further includes:
  determining whether a second bearer node is connected with a bearer node in another management domain;
  if the second bearer node is connected with a bearer node in another management domain, notifying, by the entity of the bearer control layer, a second entity of the bearer control layer of another management domain that network topology resources have been changed and updating, by the entity of the bearer control layer, resource occupation of the entity of the bearer control layer according to topology resource occupation of a service connection affected by the second bearer node;
  if the second bearer node is not connected with a bearer node in another management domain, updating directly, by the entity of the bearer control layer, resource occupation of the entity of the bearer control layer according to the topology resource occupation of the service connection affected by the second bearer node.

In the above technical solution, more than one function entities having identical characteristics are set as multiple home function entities in the embodiment of the present invention, and the multiple home function entities and other function entities connected with them form a multi-homed relationship. The multiple home function entities can intercommunicate mutually by configuration or a certain secure transmission channel so as to know each other, thereby to determine whether to switch between the multiple home function entities. When one or more of the home function entities are in failure, other home function entities can take over the work of the home function entities in failure, ensuring the continuity of data flows of services and preventing the services from being interrupted. This method may greatly improve the reliability and the load balancing ability of the end-to-end QoS architecture and makes it convenient to perform network layout and adjust the service flow. For different conditions of various services and the specific condition of a network, different redundant home function entities may be set to meet the demands of users for QoS. Furthermore, the present invention puts no limitation on the network architecture, is applicable to a network of any scale and simple to be implemented, and it is easy to maintain and manage the network according to the embodiment of the present invention.

In another embodiment, a method for ensuring reliability in a network including a separate bearer control layer includes:
  determining whether a first bearer node having a backup node is in failure, wherein the first bearer node belongs to an entity of the bearer control layer storing a backup relationship between two bearer nodes;
  if the first bearer node having a backup node is in failure switching all services at the first bearer node to the backup node of the first bearer node, reporting a state of the first bearer node to the entity of the bearer control layer and updating, by the entity of the bearer control layer, resource occupation of the entity of the bearer control layer according to topology resource occupation of a service connection affected by the first bearer node.

The method further includes:
  determining whether the first bearer node is connected with a second bearer node in another management domain before the process of updating the resource occupation of the entity of the bearer control layer;
  notifying, by the entity of the bearer control layer to which the first bearer node belongs, a second entity of the bearer control layer of another management domain that network topology resources have been changed if the first bearer node is connected with the second bearer node in another management domain.

Preferably, the method further includes:
  receiving an acknowledgment returned by the second entity of the bearer control layer of another management domain upon notifying the second entity of the bearer control layer of another management domain that the network topology resources have been changed.

The process of updating the resource occupation of the entity of the bearer control layer includes:
  upon receiving the state of the first bearer node and the acknowledgement returned by the second entity of the bearer control layer of another management domain,
  updating, by the entity of the bearer control layer to which the first bearer node belongs, the resource occupation of the entity of the bearer control layer according to the topology resource occupation of the service connection affected by the first bearer node;
  updating, by the second entity of the bearer control layer of another management domain, in-domain and inter-domain topology resource occupation of the second entity of the bearer control layer according to information that the network topology resources have been changed.

The process of determining whether the first bearer node having a backup node is in failure includes:
  determining, by the backup node of the first bearer node, whether the first bearer node is in failure according to whether a heartbeat handshaking signal has been received within a period from the first bearer node.

The process of determining whether the first bearer node having a backup node is in failure includes:
  determining, by the entity of the bearer control layer, whether the first bearer node is in failure;
  determining, according to the backup relationship stored in the entity of the bearer control layer, whether the first bearer node has a backup node if the first bearer node is in failure;
  notifying, by the entity of the bearer control layer according to the backup relationship, the backup node of the first bearer node to take over all the services at the first bearer node if the first bearer node has a backup node.

The method further includes:
sending, by the entity of the bearer control layer to which the first bearer node belongs, strategy information at the first bearer node to the backup node of the first bearer node if determining to send the strategy information at the first bearer node to the backup node of the first bearer node.

The process of updating the resource occupation of the entity of the bearer control layer includes:
updating, by the entity of the bearer control layer to which the first bearer node belongs, the resource occupation of the entity of the bearer control layer according to the topology resource occupation of the service connection affected by the first bearer node upon receiving the state of the first bearer node.

In the method, the first bearer node changes into a backup node upon recovering to normal; the entity of the bearer control layer to which the first bearer node belongs modifies the state of the first bearer node as available.

In yet another embodiment, a network according to a preset proportionally distributing strategy includes:
multiple home function entities which have identical functional characteristics;
a coupled function entity, for connecting to the multiple home function entities, distributing, based on service flow according to a preset proportionally distributing strategy, services to the multiple home function entities;
if a determination is made to switch between the multiple home function entities, a first home function entity that operates normally taking over work of a second home function entity to be switched.

The network further includes a heartbeat line between any two home function entities of the multiple home function entities of the coupled function entity for detecting a working state.

Preferably, the network further includes a data backup channel between the two home function entities for backing up data of each other.

The network further includes:
a protocol connection between the coupled function entity and the second home function entities; and
the coupled function entity, for detecting a state of the protocol connection, determining to switch the second home function entity if the protocol connection is disconnected.

In the network, the coupled function entity is an entity of the bearer control layer while the home function entity is one of a bearer node, an access node and an edge/transmission router, wherein the access node or the edge/transmission router is located in the same management domain as the entity of the bearer control layer; the coupled function entity is an edge/transmission router while the home function entity is a bearer control function entity;
the coupled function entity is an edge/transmission router while the home function entity is an edge/transmission router in other management domain;
the coupled function entity is a service control function while the home function entity is an entity of the bearer control layer;
the coupled function entity is an entity of the bearer control layer while the home function entity is a service control function entity;
the coupled function entity is an entity of the bearer control layer of a first management domain while the home function entity is an entity of the bearer control layer of a second management domain.

In the method provided by an embodiment of the present invention, with respect to two bearer nodes, such as two ERs or two BRs, which are set as backup nodes for each other, services can be switched rapidly from a bearer node to its backup node through failure switching between the routers backing up each other when there is a failure in either of the bearer nodes. it may ensure that the service connection can have the service of equivalent QoS when there is a failure in the bearer node, improving the reliability of end-to-end QoS greatly.

Furthermore, according to an embodiment of the present invention, the demand of a user for QoS can be satisfied according to the specific conditions or the network and based on different conditions of various services. The method is simple to be implemented, easy to be maintained and managed, and applicable to a network of any scale. In addition, the bearer nodes backing up each other can also serve a load balancing function at the same time.

DETAILED DESCRIPTION OF THE PREFERRED EMBODIMENTS

According to an embodiment of the present invention, in a network, more than one function entities having identical characteristics are set as multiple home function entities, thus a multi-homed relationship forms between the multiple home function entities and other function entities connected therewith, that is, coupled function entities. A coupled function entity distributes services to the multiple home function entities based on the service flow according to a preset proportionally distributing strategy; the multiple home function entities may intercommunicate mutually by configuration or a certain secure transmission channel so as to know about each other. thereby determining whether to switch between the multiple home function entities. When there is a failure in one or more of the multiple home function entities, other home function entities may take over the work of the home function entities in failure, ensuring the continuity of data flows of services and preventing the services from being interrupted.

Figure 1:
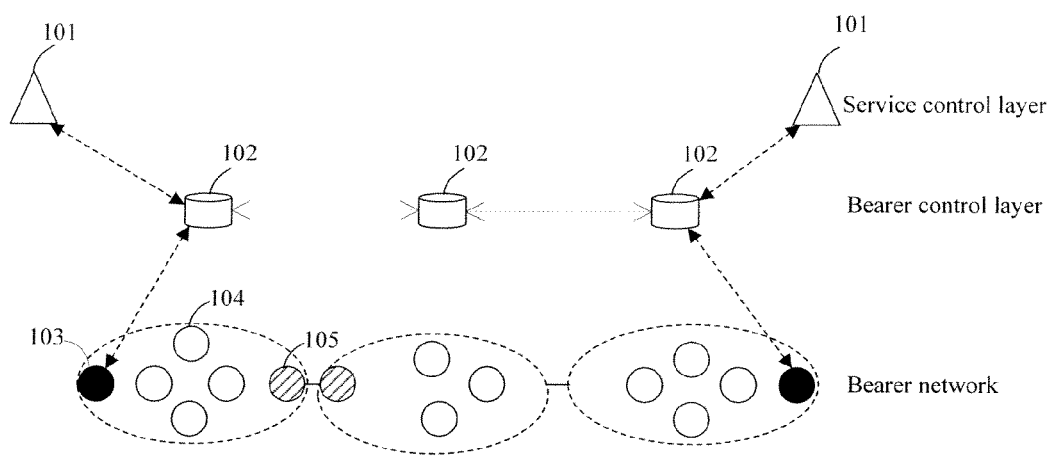
FIG. 1 shows a conventional network model of a network including a separate bearer control layer.
Figure 2:
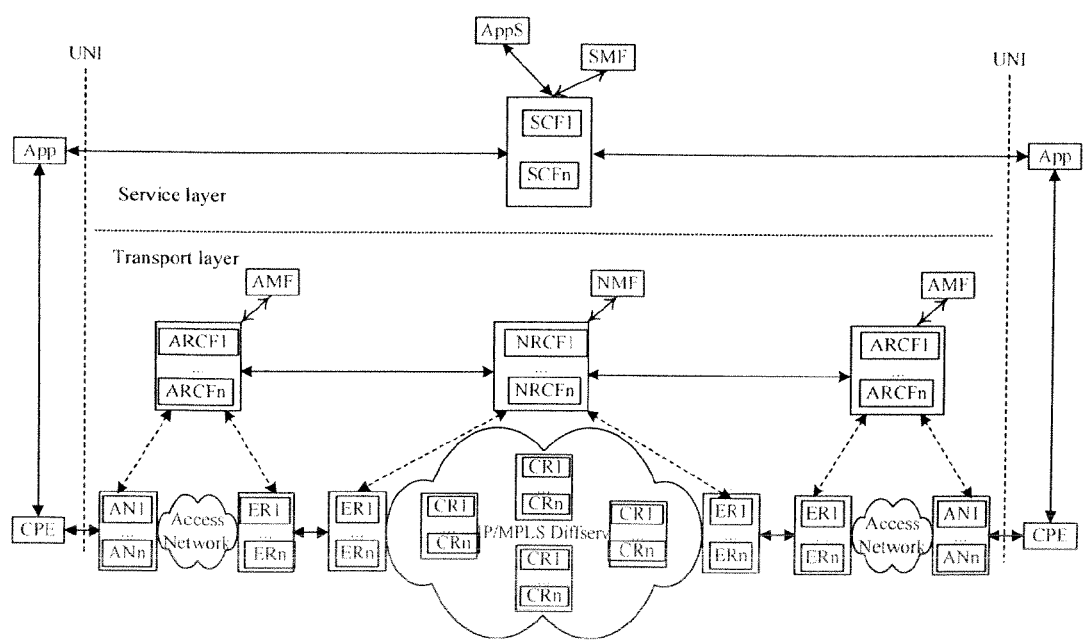
FIG. 2 is a schematic diagram for multi-homed networking in accordance with an embodiment of the present invention.

Multi-homed means a special connecting manner, that is, the multiple home function entities are connected with another function entity. As shown in FIG. 2, an Access Node (AN) as a coupled function entity can be connected to multiple ERs, which serve as the multiple home function entities of the AN; an ER or an AN may also be connected to multiple Resource Control Function (RCF) entities in one domain, with the ER or the AN as the coupled function entity while the RCF entities as the home function entities; an RCF can be connected as a coupled function entity to multiple SCF entities, which serve as the home function entities, similarly, an SCF can be connected as a coupled function entity to multiple RCF entities, which serve as the home function entities; and an RCF can be connected as a coupled function entity to multiple RCF entities in another domain, with the RCF entities in another domain as the multiple home function entities of the RCF entities.

When there is a failure in one or more of the home function entities, for example, a connection with the coupled function entity is disconnected, or there is a software/hardware failure or the like, another home function entity may take over the work of the home function entities in failure, thus ensuring the continuity of data flows of services and preventing the services from being interrupted. Certainly, in the case that there is no failure, the switching can also be instructed by an order from a third party.

Figure 3:
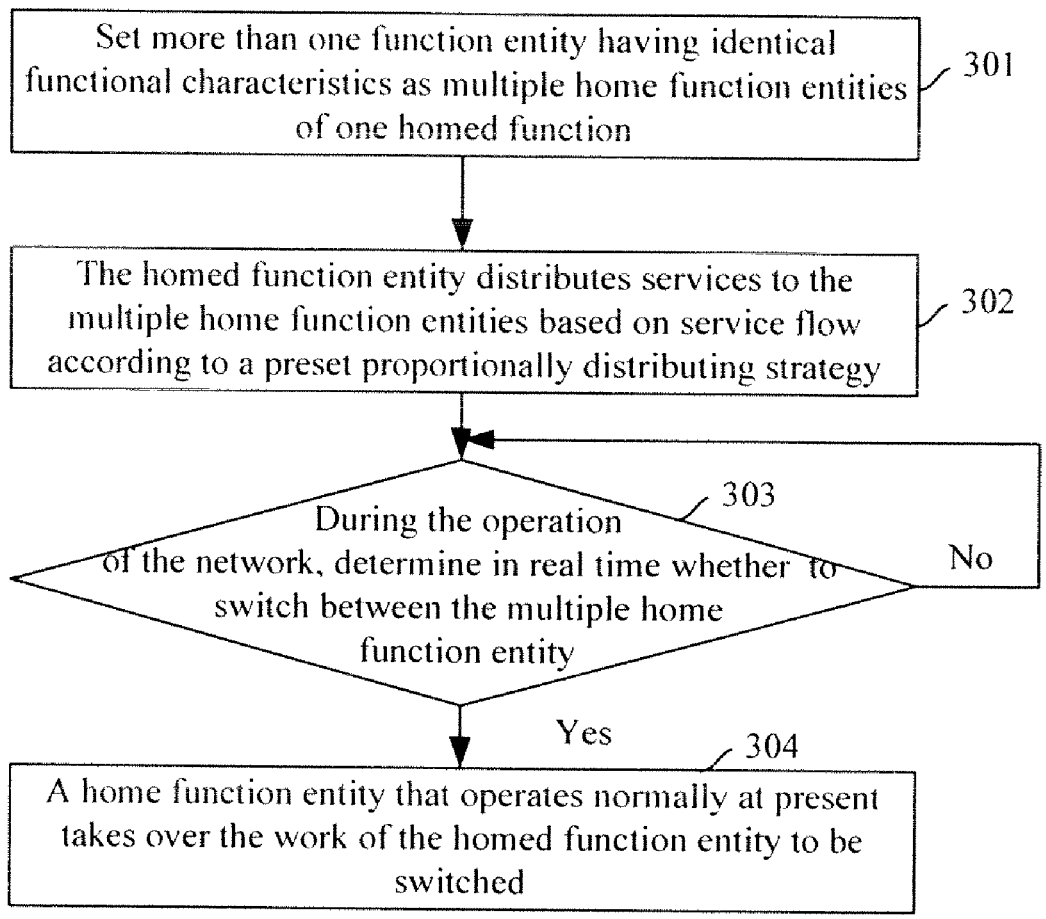
FIG. 3 is a flowchart of a method for ensuring reliability of a network including a separate bearer control layer in accordance with an embodiment of the present invention.

As shown in FIG. 3, the method in accordance with an embodiment of the present invention includes the following steps.

Step 301: set two or more function entities having identical functional characteristics as multiple home function entities of one coupled function entity.

Step 302: the coupled function entity distributes services to the multiple home function entities based on the service flow according to a preset proportionally distributing strategy. Wherein, if the percentage of the service flow shared by a home function entity is zero, the home function entity can be regarded as a backup home function entity, that is, as the backup home function entity of other home function entities, the home function entity performs no service processing in a normal condition. If all the multiple home function entities are operating simultaneously, the multiple home function entities are regarded as working in a load sharing manner.

Step 303: during the operation of the network, determine in real time whether to switch between the home function entities, and perform Step 304 if yes; otherwise, repeat Step 304: a home function entity operating normally at present takes over the work of the home function entity to be switched.

If the multiple home function entities work in a manner of being master/backup for each other, they are referred to as a master/backup home function entity respectively. During normal operation, it is needed to detect in real time a current state of the master/backup home function entity among the multiple home function entities and determine whether to switch between the master home function entity and the backup home function entity. And, the current state can be detected through the method in which the master/backup home function entity detects the current state of each other, or through the method in which a third party directly detects the current states of the home function entities. A detecting method can be implemented through a heartbeat line as well as a signaling transfer channel between the master home function entity and the backup home function entity.

Figure 4:
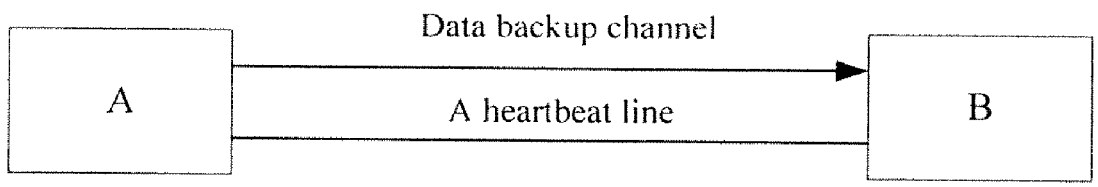
FIG. 4 is a schematic diagram illustrating connections between any two home function entities in accordance with an embodiment of the present invention.

As shown in FIG. 4, A refers to a master home function entity, B refers to a backup home function entity, and there is a heartbeat line, through which state maintenance and negotiation are performed, between the two home function entities. There is also a data backup channel between the two home function entities to implement non-real-time automatic data backup or to backup data through a maintenance command.

The backup home function entity detects the current state of the master home function entity, which is described as follows:

if receiving no heartbeat signal from the master home function entity in a designated time period, the backup home function entity determines that there is a failure in the master home function entity and changes the state of itself to "work", indicating that the backup home function entity can perform signaling interaction with other entities connected with itself normally. Herein, communications through the heartbeat line adopt a private protocol generally, the value of the designated time period can be configured in advance; meanwhile, a heartbeat sending timer for indicating when to send the heartbeat signal, and a heartbeat overtime timer for indicating whether it is overtime to receive the heartbeat signal, are also configured.

The multiple home function entities may also work in a manner of load sharing, and in this case, the detecting method may be as follows: each home function entity detects through the heartbeat line whether its peer home function entity is in a normal working state.

A protocol connection, such as a Transfer Control Protocol/Internet Protocol (TCP/IP) connection, a Simple Control Transmission Protocol/Internet Protocol (SCTP/IP) connection, or other protocol connections, may be created between the coupled function entity and a home function entity, and the coupled function entity detects the state of the connection. If the coupled function entity detects that the connection is disconnected, it is determined that there is a failure at the home function entity corresponding to the connection, thus the services may be switched.

The process of taking over the services is actually a backing up process when there is the heartbeat line, and the current services and the subsequent services of the coupled function entity are taken over by the home function entity in the normal working state. In the process of taking over the services when there is no heartbeat line, it can be only guaranteed that the subsequent services of the coupled function entity will be taken over by the home function in the normal working state and it may be impossible for the current services to be guaranteed.

The technical solution in accordance with the present invention is hereinafter described with an example in which RCF entities serve as multiple home function entities of an ER.

The RCF entities serving as multiple home function entities of an ER means that the ER (ER1) is connected with multiple RCF entities (RCF1, ..., RCFn) in one domain, that is, the ER is controlled by multiple RCF entities.

The process is described below.

The QoS demands of different users or different services from the SCF are sent to RCF1, ..., RCFn respectively, and RCF1, ..., RCFn determine bearer routes needed according to the network topology and the resource status respectively, send both the bearer routes and the QoS parameters to ER1 so as to complete the route selection for the bearer data flows of the different users or different services initiated in ER1.

RCF1, ..., RCFn release the corresponding QoS resources and issue a bearer resource releasing command to ER1 to cancel the corresponding resource reservation of the bearer data flows in ER1 when receiving a resource releasing request from the SCF.

If there is a failure in one or more of the RCF entities, such as RCF1, RCF2, for example, if the connection with the ER is disconnected, the ER will send the state information of the affected services to one or more of the other home function entities which are not in failure, such as, RCF3, RCF4, and the work of the home function entity in failure is taken over by one or more of the other home function entities which are not in failure to prevent the services from being interrupted.

The method in accordance with the present invention is hereinafter described with an example in which ERs serve as multiple home function entities of an RCF.

The ERs serving as multiple home function entities of an RCF means that the RCF (RCF1) is connected with multiple ERs (ER1, ..., ERn) in one domain and the RCF controls multiple ERs.

The process is described below.

The QoS demands of different users or different services from the SCF are sent to RCF1, and RCF1 determines bearer routes needed respectively according to originations and destinations of the services, the network topology and the resource status, sends the bearer routes and the QoS parameters to ER1, . . . , ERn respectively, so as to complete the route selection for the bearer data flows initiated in ER1, . . . , ERn.

When receiving a resource releasing request from the SCF, RCF1 releases the corresponding QoS resources and issues, according to the originations and destinations of the services, a bearer resource releasing command to a related ER to cancel the corresponding resource reservation of the bearer data flows in the related ER.

If there is a failure in one or more of the ERs, such as ER1 and ER2, the RCF sends the state information of the affected services to one or more of the other home function entities which are not in failure, such as, ER3 and ER4, and the work of the home function entity in failure is taken over by the one or more of the home function entities that are not in failure to prevent the services from being interrupted.

By analogy, the multi-homed processes of other function entities can be obtained based on the characteristics of their connections and functions, respectively.

The present invention is hereinafter described with another embodiment in which the home function entity is a bearer node and the coupled function entity is a bearer control node. In the embodiment, multiple home function entities work in the master/backup manner, that is, only one home function entity operates as the master home function entity while other home function entities operate as backup function entities and do not work for the moment.

In this embodiment, the method of backing up a bearer node is adopted to support the operation in which, when there is a failure at a bearer node, the service data flows at the bearer node in failure are switched to a backup bearer node, thereby keeping the service connection served and improving the reliability of the QoS. Herein, the bearer node refers to an ER or a Border Router (BR).

Figure 5:
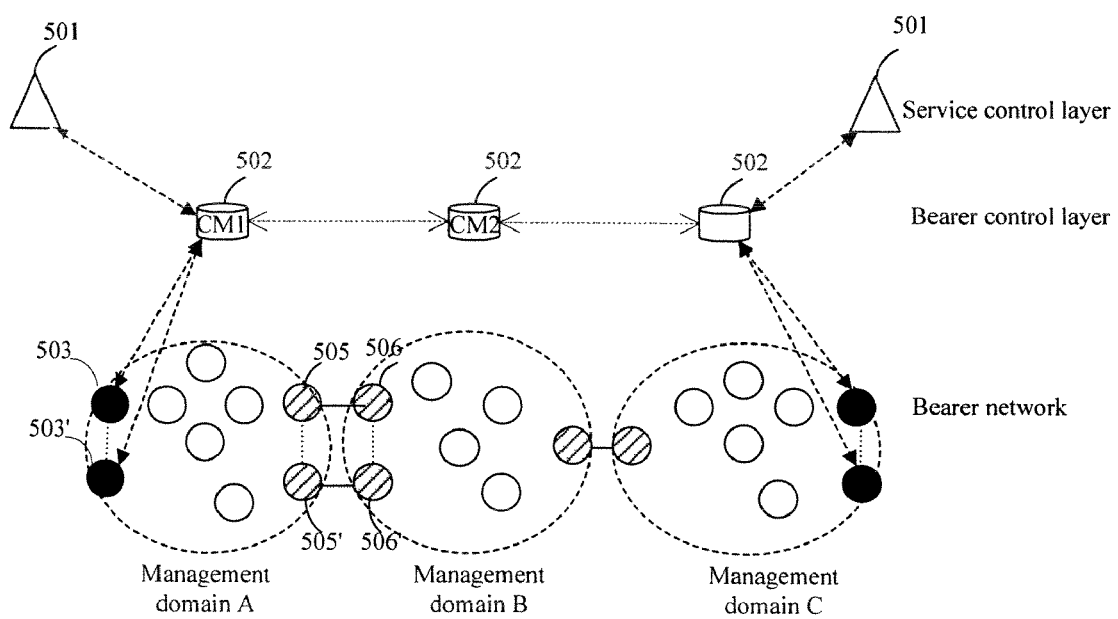
FIG. 5 is a schematic diagram illustrating a network model of a network including a separate bearer control layer in accordance with an embodiment of the present invention.

FIG. 5 is a schematic diagram illustrating the network model of a network including a separate bearer control layer in accordance with an embodiment of the present invention. As shown in FIG. 5, 501 is a service server, which belongs to the service control layer and implements functions such as soft-switch; 502 is a bearer network resource manager, which belongs to the bearer control layer. There are several management domains, management domain A, management domain B and management domain C, in the bearer network. 503 and 503' are ERs, which belong to management domain A, are two bearer nodes backing up each other; 505 and 505' are BRs, which belong to management domain A, are two bearer nodes backing up each other; likewise, 506 and 506' are BRs, which belong to management domain B, are two bearer nodes backing up each other; Herein, BR 505 is connected with BR 506, and accordingly, BR 505' is connected with BR 506'. In FIG. 5 each dashed line between 503 and 503', between 505 and 505'; and between 506 and 506' indicates that there is a heartbeat mechanism for each bearer node to detect whether a peer node is operating normally, as well as an interactive connection mechanism for interchanging route information between 503 and 503', between 505 and 505', and between 506 and 506'.

For all the ERs and B s in a bearer network, a backup can be set for some or all of the ERs and BRs respectively according to demands of users or requirements of network layout. Therefore, the premise for implementing the present invention is below: a backup node is set for one or more ERs or BRs in a certain domain of a bearer network, respectively, and the entity of the bearer control layer to which the backup bearer node belongs is notified to record the backup relationship between the bearer nodes; at the same time, a heartbeat mechanism, which detects whether the peer node is operating normally, is configured between the bearer nodes backing up each other. The heartbeat mechanism described herein may include: heartbeat handshaking signals are sent periodically between the two bearer nodes backing up each other and if a bearer node receives a heartbeat handshaking signal of the peer node within a period, the bearer node believes that the peer node is operating normally; otherwise, the bearer node believes that the peer node is in failure. The two bearer nodes backing up each other in normal working states can independently perform part of routing functions respectively, and if one of the two bearer nodes is in failure, the other bearer node takes over all the services of the bearer node in failure immediately and continues its previous services at the same time. After a backup node is set, the backup relationship between the bearer nodes are stored both at an entity of the bearer control layer and at the bearer nodes each of which is the backup of the other. Herein, the entity of the bearer control layer is a bearer network resource manager.

In addition, a connection mechanism for interaction of other data can be further created between the two bearer nodes backing up each other, enabling the two bearer nodes to interchange route information with each other.

Figure 6:
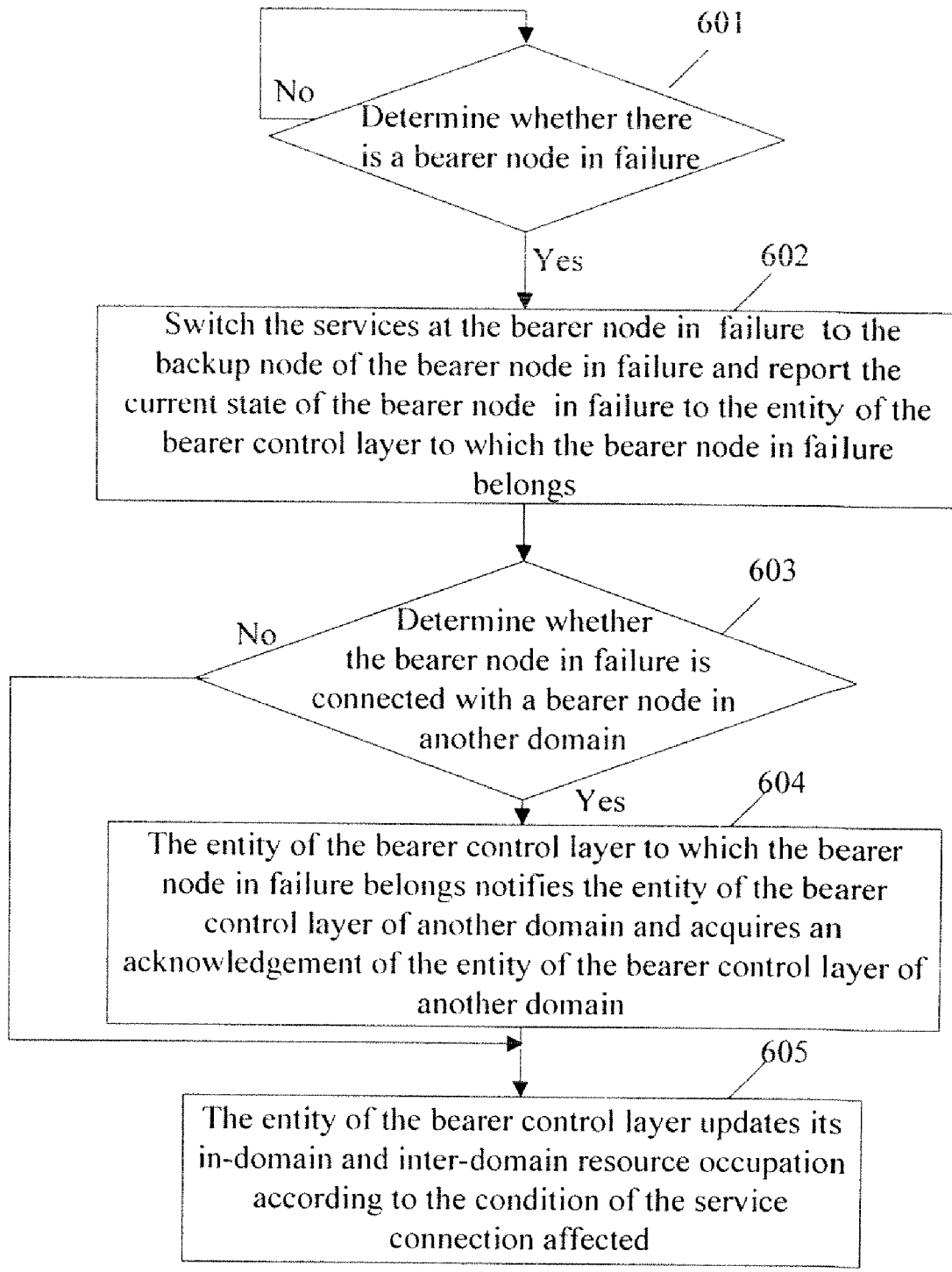
FIG. 6 is a flowchart of a method for ensuring reliability of a network including a separate bearer control layer in accordance with an embodiment of the present invention.

Based on the above, the specific implementing process of the method in accordance one embodiment of the present invention is shown in FIG. 6, including the following steps.

Steps 601~602: detect and determine whether a bearer node having a backup node is in failure, if no, repeat the detection and determination; if yes, switch all the services at the bearer node in failure to the backup node of the bearer node in failure, that is, the backup node of the bearer node in failure takes over all the services at the bearer node in failure and reports the current state of the bearer node in failure to the entity of the bearer control layer to which the bearer node in failure belongs. The entity of the hearer control layer modifies the state of the bearer node in failure stored in itself upon receiving the current state of the bearer node in failure. When recovering to a normal state, the bearer node in failure automatically becomes a backup node of the bearer node that is operating currently, and at the same time, the entity of the bearer control layer corresponding to the bearer node recovered modifies the state of the bearer node recovered as available.

There can be two ways in performing Steps 601~602. In one case, the backup node detects whether its peer node is in failure; in the other case, the entity of the bearer control layer detects whether there is a bearer node in failure.

In the first case, if a bearer node having a backup node is in failure, the backup node of the bearer node in failure can perceive, according to the detection through the heartbeat mechanism, that the peer node is in failure, so the backup node of the bearer node in failure takes over all the services at the bearer node in failure immediately and sends a notification to the entity of the bearer control layer indicating that it has taken over the services of the bearer node in failure.

In the second case, upon detecting that a certain bearer node is in failure, the entity of the bearer control layer initiates a failure processing procedure on its own. In detail, the entity of the bearer control layer, such as a resource manager of the bearer network, detects whether there is a bearer node in failure; if no, the entity of the bearer control layer performs no processing or keeps detecting, otherwise, the entity of the bearer control layer determines according to the backup relationship between bearer nodes stored in itself whether the bearer node in failure has a backup, and notifies according to the backup relationship the backup node of the bearer node in failure to take over immediately all the services of the bearer node in failure.

Steps 603~604: determine whether the bearer node in failure is connected with a bearer node in a peer management domain, that is, determine whether the failure occurs at the border of the management domain of the bearer network, and forward to Step 605 directly if no; otherwise, the entity of the bearer control layer to which the bearer node in failure belongs notifies the entity of the bearer control layer of the peer management domain that the network resources and topology structure have been changed, that is, the entity of the bearer control layer to which the bearer node in failure belongs notifies the entity of the bearer control layer to which the bearer node connected with the bearer node in failure belongs that the switching between the bearer nodes has occurred and all the services at the bearer node in failure have been switched to the backup node.

For example, in FIG. 5, if BR 505 is in failure, all the services at BR 505 will be switched to BR 505', and at the same time, Content Manager 1 (CM1) needs to notify CM2 that the switching occurs at the BR in management domain A with which BR 506 is connected, because BR 505 is connected with BR 506, BR 505 belongs to management domain A of CM1, and BR 506 belongs to management domain B of CM2. Meanwhile, if BR 505 is connected only with BR 506 and BR 505' is connected only with BR 506', CM2 also needs to switch BR 506 to BR 506'; if BR 506 is connected with both BR 505 and BR 505', CM2 need not switch between the BRs.

Upon sending the notification to the peer domain, the entity of the bearer control layer to which the bearer node in failure belongs waits for the acknowledgement returned by the entity of the bearer control layer of the peer domain.

The interaction between the two entities of the bearer control layer can be implemented through a conventional interaction protocol and a conventional procedure.

Step 605: upon receiving notification that the switching between the bearer nodes has occurred, or receiving the notification that the switching between the bearer nodes has occurred and the acknowledgement of the entity of the bearer control layer of the peer domain, the entity of the bearer control layer updates its resource occupation according to the topology resources occupied by the service connection affected by the bearer node in failure.

The entity of the bearer control layer can further determine whether to send original strategy information at the bearer node in failure to the backup node of the bearer node in failure so as to ensure that the backup node continues to provide the same QoS for all the service data flows at the bearer node in failure, and sends the original strategy information at the bearer node in failure to the backup node of the bearer node in failure if yes; otherwise, performs no processing.

At the same time, if an entity of the bearer control layer of a management domain receives a changing message of topology resources sent by the entity of the bearer control layer of other management domains, the entity of the bearer control layer of the management domain receiving the changing message needs to update its in-domain and inter-domain topology resource occupation according to the condition of the service connection affected. Updating refers to comprehensive adjustment of the in-domain aid inter-domain resource occupation according to the call topology and resources needed in a call. For example, suppose that there are originally connections of 50 telephone services at BR 505 that is in failure and the connections occupy a bandwidth of 100K, the 50 telephone services are switched to BR 505' upon switching +he bearer node in failure, i.e., BR 505, and accordingly the topology structure, the in-domain and inter-domain resource allocation have all been changed. Therefore, the entity of the bearer control layer, such as a resource manager of the bearer network, needs to adjust its in-domain and inter-domain resource occupation according to the resource occupation changed and the network topology structure newly formed, such as the adjustment of the routes occupied by the service connections and the like. How to implement the adjustment of the in-domain and inter-domain resources is not the keystone of this application and will not be described herein.

To sum up, the foregoing descriptions are only preferred embodiments of the present invention and are not for use in limiting the protection scope thereof.

What is claimed is:

1. A method for ensuring reliability in a network including a separate bearer control layer, the method comprising:
   distributing, based on service flow according to a preset proportionally distributing strategy, services of one coupled function entity to multiple home function entities of the coupled function entity, wherein the multiple home function entities have identical functional characteristics in the network;
   taking over, by a first home function entity operating normally, work of a second home function entity to be switched if determining to switch between the multiple home function entities;
   wherein when the coupled function entity is an entity of the bearer control layer and the multiple home function entities are bearer nodes, the first home function entity being a first bearer node among the bearer nodes and the second home function entity being a second bearer node among the bearer nodes, determining whether the second bearer node is connected with a bearer node in another management domain;
   if the second bearer node is connected with a bearer node in the another management domain, notifying, by the entity of the bearer control layer, a second entity of the bearer control layer of the another management domain that network topology resources have been changed and updating, by the entity of the bearer control layer, resource occupation of the entity of the bearer control layer according to topology resource occupation of a service connection affected by the second bearer node; and
   if the second bearer node is not connected with a bearer node in the another management domain, updating directly, by the entity of the bearer control layer, resource occupation of the entity of the bearer control layer according to the topology resource occupation of the service connection affected by the second bearer node.

2. The method of claim 1, wherein the process of determining to switch between the multiple home function entities comprises:
   detecting, in real time through a heartbeat line between any two home function entities of the multiple home function entities, whether the first home function entity receives a heartbeat signal of the second home function entity in a designated time period; and
   determining to switch between the multiple home function entities if the first home function entity receives no heartbeat signal of the second home function entity in the designated time period.

3. The method of claim 1, wherein the process of determining to switch between the multiple home function entities comprises:
   determining, by the coupled function entity, whether the second home function entity is in failure or a switching instruction is received from a third party; and
   determining to switch the services to the first home function entity if the second home function entity is in failure or the switching instruction is received from a third party.

4. The method of claim 3, wherein the process of determining whether the second home function entity is in failure comprises:
   detecting, by the coupled function entity, state of a protocol connection between the coupled function entity and the second home function entity; and determining that the second home function entity corresponding to the protocol connection is in failure if the protocol connection is disconnected.

5. The method of claim 1, wherein the multiple home function entities work in a master/backup manner or in a load sharing manner.

6. A method for ensuring reliability in a network including a separate bearer control layer, comprising:
   determining, by a backup node of a first bearer node or by an entity of the bearer control layer storing a backup relationship between the backup node and the first bearer node, whether the first bearer node having the backup node is in failure, wherein the first bearer node belongs to the entity of the bearer control layer storing the backup relationship between the backup node and the first bearer node;
   if the first bearer node having the backup node is in failure, taking over, by the backup node of the first bearer node, all services at the first bearer node, and then reporting, by the backup node if the process of determining is performed by the backup node, a state of the first bearer node to the entity of the bearer control layer, and determining, by the entity of the bearer control layer, whether the first bearer node is connected with a second bearer node in another management domain;
   notifying, by the entity of the bearer control layer to which the first bearer node belongs, a second entity of the bearer control layer of the another management domain that network topology resources have been changed, if the first bearer node is connected with the second bearer node in the another management domain; and
   updating, by the entity of the bearer control layer, resource occupation of the entity of the bearer control layer according to topology resource occupation of a service connection affected by the first bearer node.

7. The method of claim 6, further comprising:
   receiving an acknowledgment returned by the second entity of the bearer control layer of the another management domain upon notifying the second entity of the bearer control layer of the another management domain that the network topology resources have been changed.

8. The method of claim 7, wherein the process of updating the resource occupation of the entity of the bearer control layer comprises:
   upon receiving, by the entity of the bearer control layer to which the first bearer node belongs, the state of the first bearer node and the acknowledgement returned by the second entity of the bearer control layer of the another management domain, updating, by the entity of the bearer control layer to which the first bearer node belongs, the resource occupation of the entity of the bearer control layer according to the topology resource occupation of the service connection affected by the first bearer node; and
   updating, by the second entity of the bearer control layer of the another management domain, in-domain and inter-domain topology resource occupation of the second entity of the bearer control layer according to information that the network topology resources have been changed.

9. The method of claim 6, wherein the process of determining whether the first bearer node having a backup node is in failure comprises:
   determining, by the backup node of the first bearer node, whether the first bearer node is in failure according to whether a heartbeat handshaking signal has been received within a period from the first bearer node.

10. The method of claim 6, wherein the process of determining by the entity of the bearer control layer whether the first bearer node having a backup node is in failure comprises:
   determining, by the entity of the bearer control layer, whether the first bearer node is in failure;
   determining, by the entity of the bearer control layer according to the backup relationship stored in the entity of the bearer control layer, the backup node of the first bearer node if the first bearer node is in failure; and
   notifying, by the entity of the bearer control layer according to the backup relationship, the backup node of the first bearer node to take over all the services at the first bearer node.

11. The method of claim 6, further comprising:
   sending, by the entity of the bearer control layer to which the first bearer node belongs, strategy information of the first bearer node to the backup node of the first bearer node if determining to send the strategy information at the first bearer node to the backup node of the first bearer node.

12. The method of claim 6, wherein the process of updating the resource occupation of the entity of the bearer control layer comprises:
   updating, by the entity of the bearer control layer to which the first bearer node belongs, the resource occupation of the entity of the bearer control layer according to the topology resource occupation of the service connection affected by the first bearer node upon receiving the state of the first bearer node.

13. The method of claim 6, wherein,
   the first bearer node changes into a backup node upon recovering to normal; the entity of the bearer control layer to which the first bearer node belongs modifies the state of the first bearer node as available.

* * * * *